March 28, 1939.  A. C. WILCOX  2,152,122

AUTOMATIC ELECTRIC COOKING UTENSIL

Filed Aug. 28, 1934  5 Sheets-Sheet 1

Inventor
A. C. Wilcox
By Frease and Bishop
Attorneys

Inventor
A.C. Wilcox
Frease and Bishop
By
Attorneys

March 28, 1939.  A. C. WILCOX  2,152,122
AUTOMATIC ELECTRIC COOKING UTENSIL
Filed Aug. 28, 1934   5 Sheets-Sheet 4

Inventor
A. C. Wilcox
By Frease and Bishop
Attorneys

Patented Mar. 28, 1939

2,152,122

UNITED STATES PATENT OFFICE 2,152,122

AUTOMATIC ELECTRIC COOKING UTENSIL

Albert C. Wilcox, Massillon, Ohio, assignor to Federal Enameling & Stamping Company, McKees Rocks, Pa., a corporation of Pennsylvania Application August 28, 1934, Serial No. 741,811

14 Claims. (Cl. 219—40)

The invention relates to automatic electric cooking utensils for raising water to the boiling point and for automatically cutting out the electric heating means when all of the water has been discharged from the utensil or has boiled away.

Another object is to provide means for automatically breaking the circuit to the heating element when the lid or cover of the utensil is raised or removed so as to prevent the user from receiving an electric shock by accidentally contacting the water when the circuit is closed.

A still further object is to provide a cooking utensil of this character formed of insulated material which may be oxidized aluminum, enamel ware or other non-conducting material.

The above objects, together with many others which will be apparent from the drawings, or which will be later pointed out, may be attained by constructing the improved utensils in the manner illustrated in the accompanying drawings, in which—

Similar numerals refer to similar parts throughout the drawings.

The invention contemplates the use of spaced electrodes arranged to be submerged in the water to be heated, whereby the water completes the circuit between the electrodes. The invention further contemplates the provision of means for closing the circuit to the electrodes only when the lid or cover of the utensil is in closed position, and although several forms of heating unit, as well as several forms of lid or cover closing means are hereinafter illustrated and described, it will be seen that none of these forms departs from the spirit of the invention and that the same is applicable to any form of cooking utensil designed for the heating of water.

Figures 1, 2, 18:
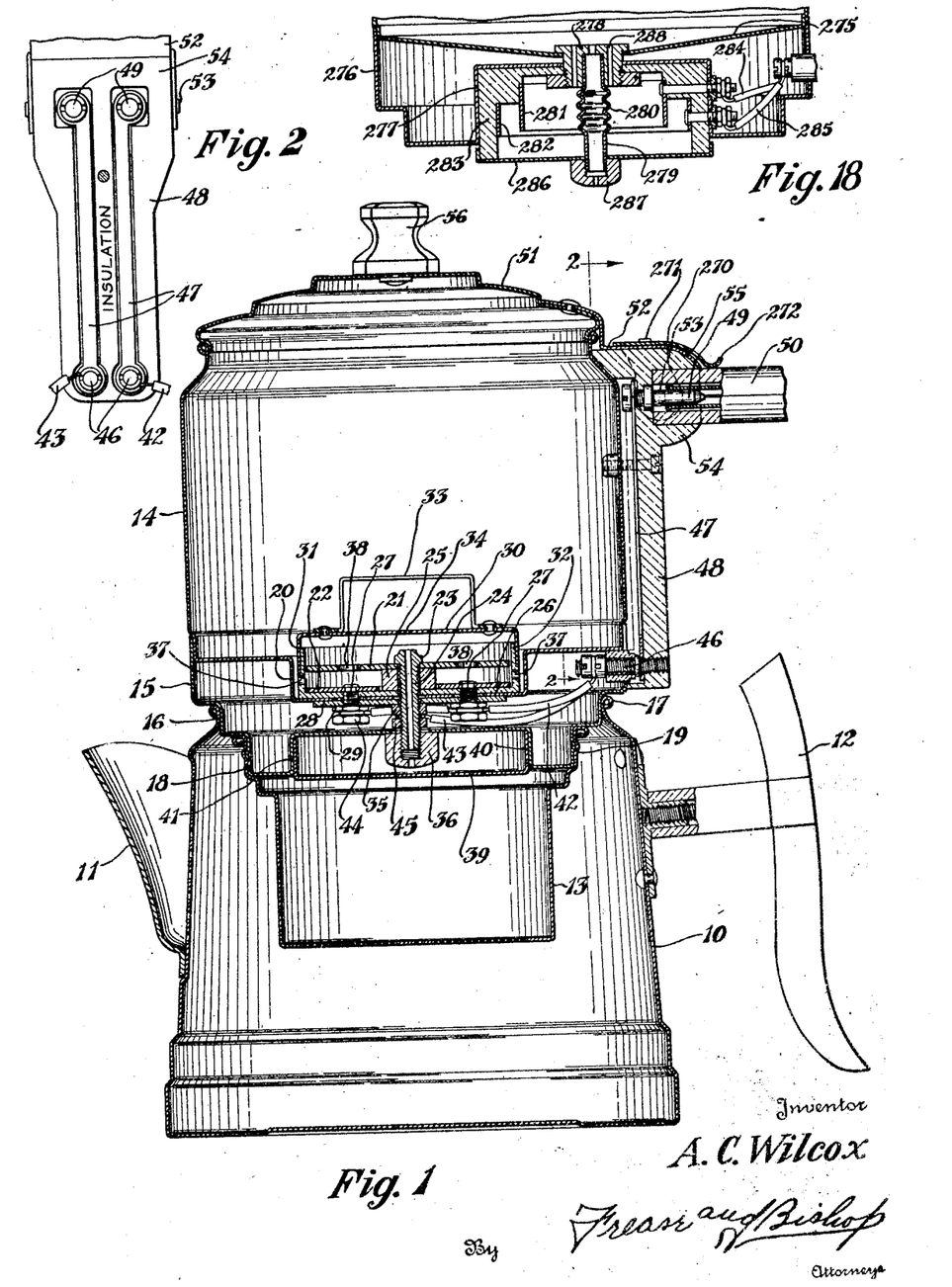
Figure 1 is a vertical sectional view through an automatic electric drip coffee maker embodying the invention.
Fig. 2, a detail sectional view taken on the line 2—2, Fig. 1.
Fig. 18, a fragmentary sectional view of a modified form of heating unit.

Referring first to the construction shown in Figs. 1 and 2, an automatic electric drip coffee maker is illustrated, comprising generally the pot or beverage receptacle 10, having the spout 11 and handle 12 as in usual practice, the perforate ground coffee basket 13 suspended within the upper portion of the pot, and the water container 14 located above the coffee basket and so arranged that the water discharged therefrom will pass through the ground coffee in the basket, leaching the coffee therein and the finished coffee beverage will drip from the coffee basket into the pot 10.

A lower shell 15 is connected to the lower end portion of the water container 14 and may be reduced as at 16 to fit within the upper open end of the pot 10 and rest upon the rim bead 17 thereof, a second reduced portion 18 being preferably provided to detachably receive the open upper end portion 19 of the coffee basket, which is preferably enlarged at this point, as shown in Fig. 1.

The bottom of the water container 14 may be centrally recessed as at 20 to receive the heating unit, which includes the spaced disk electrodes 21 and 22, the upper disk 21 being held against the head 23 at the upper end of the central discharge tube 24, by means of the insulation spacing collar 25.

The lower electrode disk 22 rests upon the bottom of the insulation housing member 26 and is secured to the bottom wall of the water container by the binding posts 27, an insulation disk 28 being located against the underside of said bottom wall for contact with the binding nuts 29 upon said binding posts.

A cover 30 is provided for the heating unit, having the depending peripheral flange 31 which fits tightly upon the upturned flange 32 of the insulation member 26, a handle 33 being provided for removing and replacing said cover and a central aperture 34 being formed in said cover for equalizing the pressures in the water container and within the heating unit housing.

A nut 35 is provided upon the threaded intermediate portion of the discharge tube 24 for clamping the upper electrode disk 21 down against the insulation spacing collar 25 and an insulation nut 36 is provided upon the lower threaded end of said discharge tube for clamping the lower shell 15 in position against the lower end of the water container.

Apertures 37 are provided around the upturned flange 32 of the insulation member and apertures 38 are formed in the upper electrode 21. A spreader plate 39 is located beneath the discharge tube 24, preferably having the upturned peripheral flange 40 arranged to frictionally engage within the annular recess 41 formed in the bottom of the lower shell 15. The terminal wires 42 and 43 are connected to the binding posts 27 and discharge tube 24 respectively, as by the binding nuts 44 and 45.

The wires 42 and 43 are connected by means of the binding posts 46 to the bus bars 47 located within the insulation shell 48 secured to one side of the coffee container.

The upper ends of these bus bars are connected to the plug-in points 49, to which the usual attaching plug 50 may be connected, as in usual and ordinary practice, to electrically connect the utensil with any suitable source of electric supply.

The lid or cover 51 of the water container, as well as the water container itself and the pot 10, may be formed of oxidized aluminum, enameled sheet metal or other suitable insulation material. This lid is provided with a hinge 52 hinged as at 53 upon the enlargement or knob 54 formed at the upper end of the insulation shell 48, the hinge having a curved flange 55 arranged to slide around said enlargement and to cover the plug-in points when the lid is raised to open position.

As will be clearly seen in Fig. 1, the lid cannot be opened when the connector plug 50 is in place as this flange engages the upper surface of the connector plug and prevents opening movement of the lid. However, when the connector plug is withdrawn, breaking the circuit to the disk electrodes 21 and 22, the lid may be opened as in usual and ordinary practice, by grasping the insulation knob 56 and swinging the lid upward upon its hinge joint. With the lid in the open position and the flange 55 covering the plug-in points 49, the connector plug cannot be engaged with the plug-in points. Thus, it will be seen that it is impossible for the user to receive an electric shock by opening the lid and putting the hand into the water in the water container while the current is passing through the water.

In the operation of the automatic electric drip coffee maker above described, the desired amount of ground coffee is placed in the coffee basket 13 and the same is assembled upon the water container, as shown in Fig. 1. The lid of the water container is raised and the desired amount of cold water is placed therein, the lid being then closed and the connector plug 50 inserted in position, as shown in said figure. The water from the water container passes through the apertures 37 in the side wall of the heating unit housing and up through the apertures 38 in the upper electrode disk 21 and then down through the discharge tube 24 and through the perforate spreader plate 39 into the coffee basket, the coffee beverage dripping from the perforate bottom of said coffee basket into the pot 10.

It will be seen that as the water passes into the heating unit housing and contacts with the disk electrodes 21 and 22, it completes the electric circuit, the water being rapidly heated as the current passes therethrough and heats the electrodes, the water being brought substantially to the boiling point before it passes through the discharge tube and into the coffee basket.

Figures 3, 4:
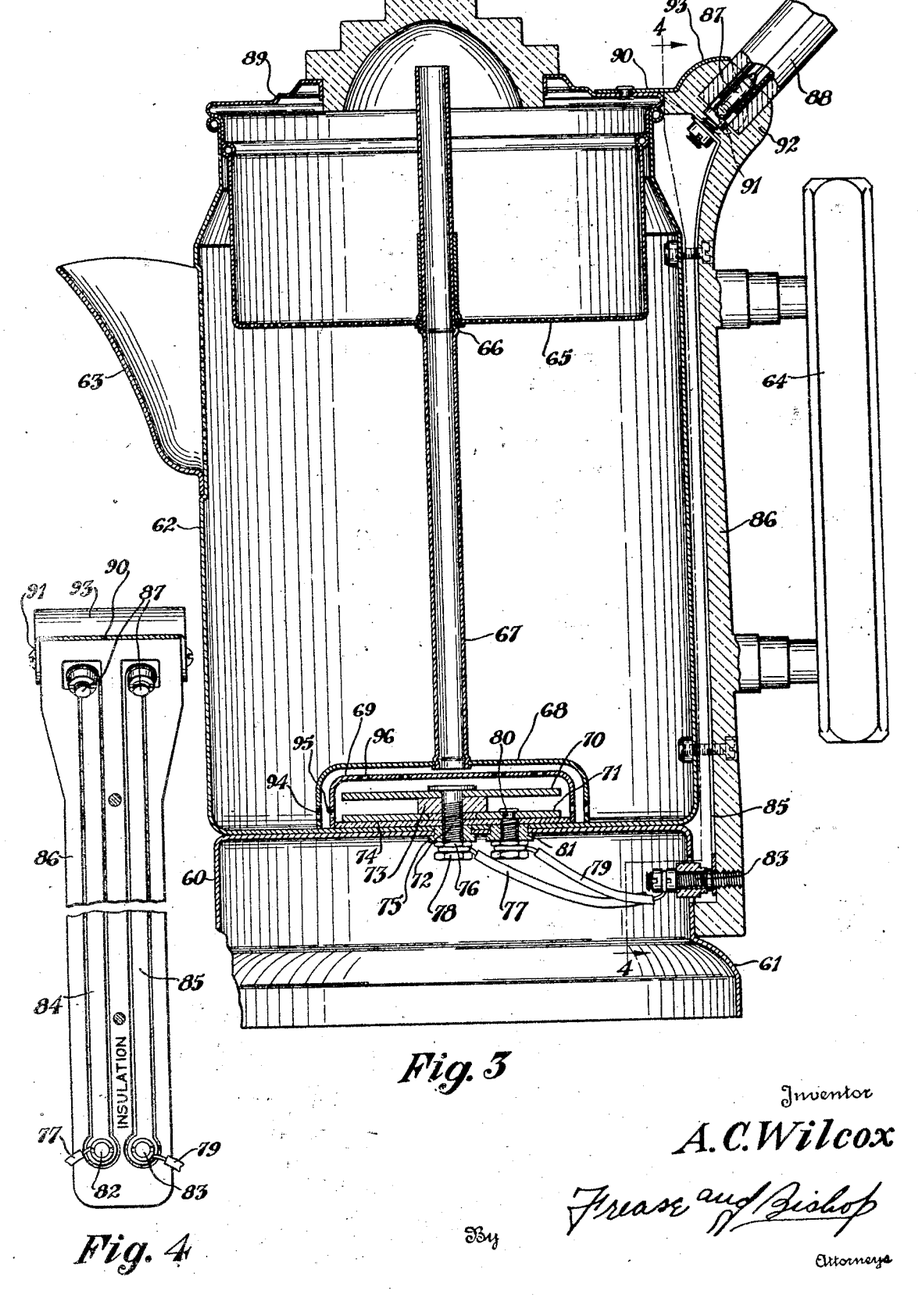
Fig. 3, a vertical sectional view through an automatic electric percolator embodying the invention.
Fig. 4, a vertical detail section taken on the line 4—4, Fig. 3.

In Figs. 3 and 4 is shown an application of the invention to an automatic electric percolator. The base, as shown at 60, may be an inverted shell, the lower end of which is preferably enlarged as at 61 and open as shown in Fig. 3. The pot 62 is fixed upon the base and may be of more or less usual and ordinary construction, having the spout 63 near its upper end and the handle 64 diametrically opposed therefrom. The coffee basket 65 may be of usual construction and rests upon the shoulder 66 formed upon the percolating tube 67, as is common in percolators.

The percolator tube and coffee basket are supported by the inverted cup-shaped shell 68 connected to the lower end of the tube and resting upon the bottom of the pot 62. Located within this shell and spaced therefrom is a somewhat similar shell 69 forming a housing for the heating unit, which comprises the spaced upper and lower electrode disks 70 and 71 mounted upon the binding screw 72 and spaced and insulated from each other by the insulation bushing 73.

The lower electrode disk is insulated from the bottom wall of the pot 62 by an insulation washer 74 and the bottom of the pot, as well as the top of the base shell 60, are insulated from the binding screw 72 as by the insulation bushing 75, a nut 76 drawing the parts together and holding them in assembled position, as shown in Fig. 3.

One of the lead wires 77 is connected to said binding screw by means of the binding nut 78 and the other lead wire 79 is connected to the binding screw 80 which contacts with the lower electrode disk 71 only, being insulated from the pot and base as by the insulation bushing 81.

The lead wires 77 and 79 are connected to the binding posts 82 and 83 respectively, which are connected to the lower ends of the bus bars 84 and 85 respectively, located within the insulation shell 86 mounted upon one side of the pot.

The upper ends of these bus bars are connected to the plug-in points 87 adapted to be engaged by the connector plug 88.

The lid or cover 89 is provided with a hinge 90 hinged as at 91 to the enlargement or knob 92 upon the upper end of the insulation shell and a curved flange 93 is formed upon the hinge and adapted to contact with the connector plug 88 when the lid is in closed position, as shown in Fig. 3, so as to prevent opening of the lid without first removing the connector plug and thus breaking the circuit to the electrodes.

In the operation of the percolator to make coffee, the desired amount of ground coffee is placed in the coffee basket 65 and the desired amount of cold water is placed in the lower part of the pot 62. The lid 89 is then closed and the connector plug 88 inserted and as the water passes through the apertures 94 and 95 in the shells 68 and 69 respectively, and contacts with the upper and lower electrode disks 70 and 71, the circuit is completed through the water from one disk to the other, heating the disks and thus rapidly heating the water within the inner shell 69, bringing the same to a boil, the boiling water passing up through the apertures 96 in the top of the inner shell and up through the percolating tube 67 and then spraying down over the coffee basket, as in usual practice.

As it is impossible to open the lid without first removing the connector plug 88, it will be seen that the user cannot accidentally contact the water in the percolator while the current is passing through the water, especially since it is impossible to insert the connector plug when the lid is open and the curved flange 93 of the hinge is located across the plug-in points 87. As the pot and lid are formed of oxidized aluminum, enameled sheet metal or other insulated material, it will be seen that it is impossible for the user to accidentally receive an electric shock by touching any portion of the outside of the utensil while the same is in operation.

An adaptation of the invention to a teakettle is illustrated in Figs. 5, 6, 7 and 8, in which the teakettle per se is indicated generally at 100, provided with the usual spout 101 and the diametrically opposed handle 102, an inverted hollow base 103 being fixed to the bottom wall of the teakettle, which is preferably provided with the centrally depressed portion 104 for a purpose to be hereinafter described.

Figures 5, 6, 7, 8:
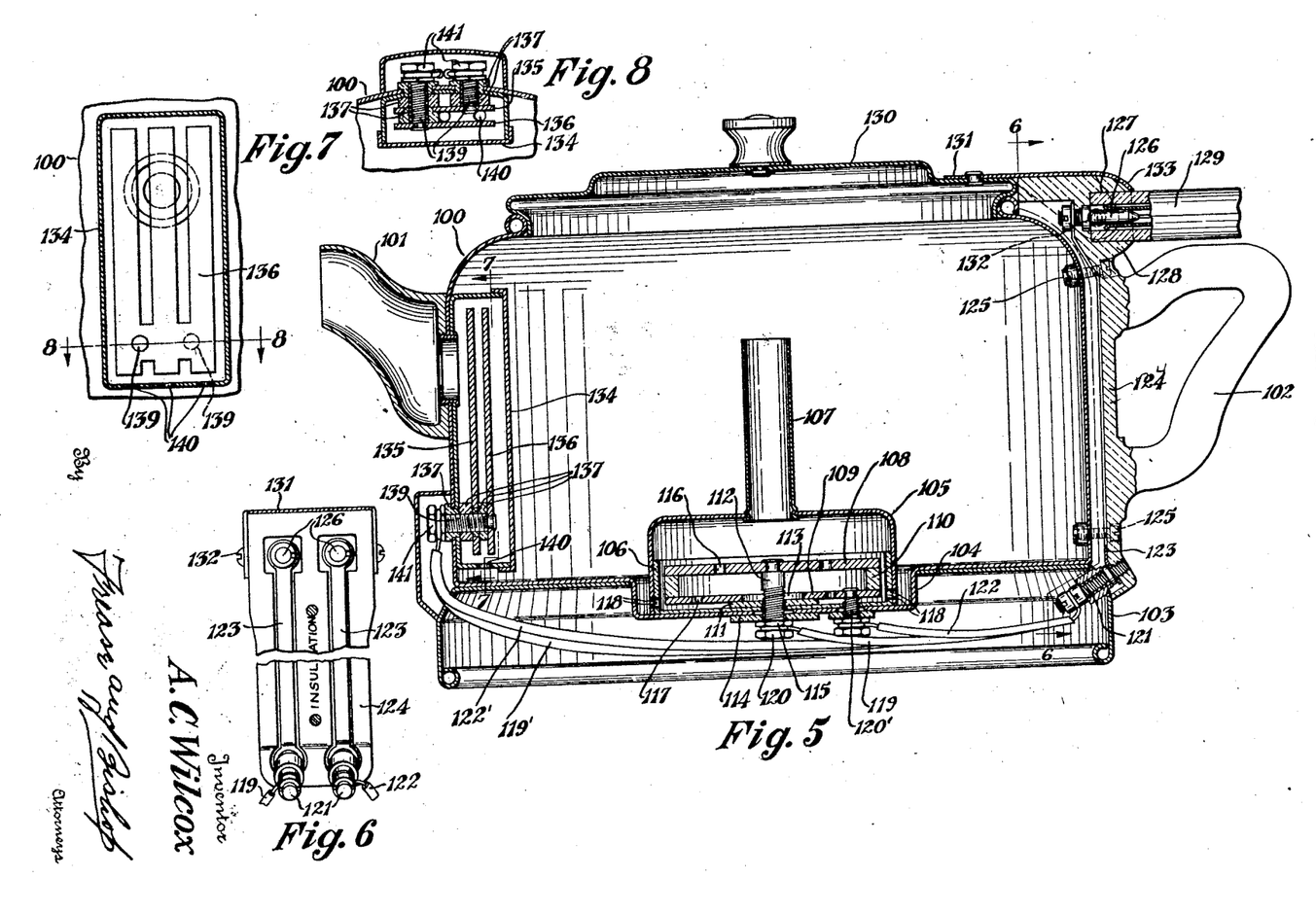
Fig. 5, a vertical sectional view through a teakettle embodying the invention.
Fig. 6, a detail sectional view on the line 6—6, Fig. 5.
Fig. 7, a detail sectional view on the line 7—7, Fig. 5.
Fig. 8, a detail sectional view on the line 8—8, Fig. 7.

The heating unit may be located in the depression 104 and covered by the inverted shell 105 within the lower portion of which is located the insulation cup 106 within which the heating unit is carried. The hot water tube 107 may communicate with the central portion of the shell 105 and extend upward into the upper portion of the teakettle.

The heating unit may comprise the spaced upper and lower electrode disks 108 and 109 respectively, spaced apart by means of the insulation ring 110, the lower disk resting upon the insulation washer 111 while the upper disk is carried by the binding screw 112 which passes through the enlarged central opening 113 of the lower disk so as not to make contact therewith. An insulation washer 114 is located upon the underside of the teakettle bottom and the parts are clamped together by means of the nut 115 upon the binding screw 112. Spaced apertures 116 and 117 may be provided in the electrode disks 108 and 109 respectively and registering apertures 118 may be formed in the side walls of the shell 105 and insulation cup 106.

The lead wire 119 is connected to the lower end of the binding screw 112 as by the binding nut 120 and leads to one of the binding screws 121, the other lead wire 122 being connected to the binding screw 120' which is in contact with the lower disk electrode 109 and leads to the other binding screw 121. The binding screws 121 are connected to the bus bars 123 which are located within the insulation shell 124 fixed to one side of the teakettle as by the screws 125, the upper ends of these bus bars being connected to the plug-in points 126 located within a socket 127 in the rounded enlarged upper end 128 of the insulation shell. This socket is adapted to receive a connector plug 129 which makes contact with the plug-in points 126.

The lid or cover 130 is provided with a hinge 131 hingedly connected as at 132 to the enlarged portion 128 of the insulation shell. This hinge has a curved flange 133 adapted to contact with the connector plug 129 when in the operative position, as shown in Fig. 5, so as to prevent opening of the lid while the connector plug is in contact with the plug-in points.

For the purpose of superheating the water as it is poured from the spout 101 of the teakettle, a heating unit may be located within a housing 134 located adjacent to the spout. This heating unit may comprise two spaced sets of electrode fingers 135 and 136 insulated from each other and from the adjacent wall of the teakettle as by the insulation bushings 137 and fixed to the inside of the teakettle as by the binding screws 139, one of which contacts with each electrode. An opening 140 in the lower portion of the housing 134 permits the water to enter the housing 134 and to pass through and around the electrodes, closing the circuit through the water as it is poured through the spout 101. The lead wires 119' and 122' may be connected to the binding screws 139 as by the nuts 141.

Either one or both of the heating units above described may be provided in the teakettle, the best results being obtained by providing both heating units so that the lower heating unit brings the water up to a fairly high temperature and the upper heating unit brings the water to the boiling point as it is poured from the kettle.

As the entire teakettle, including the lid, is formed of suitable insulated material such as oxidized aluminum, enamel ware or the like, it will be seen that the user cannot accidentally receive an electric shock by touching the outside of the same while in operation, and since it is impossible to open the lid while the current is passing through the water, it is impossible for the user to accidentally come in contact with the electrically charged water within the teakettle.

Figure 9:
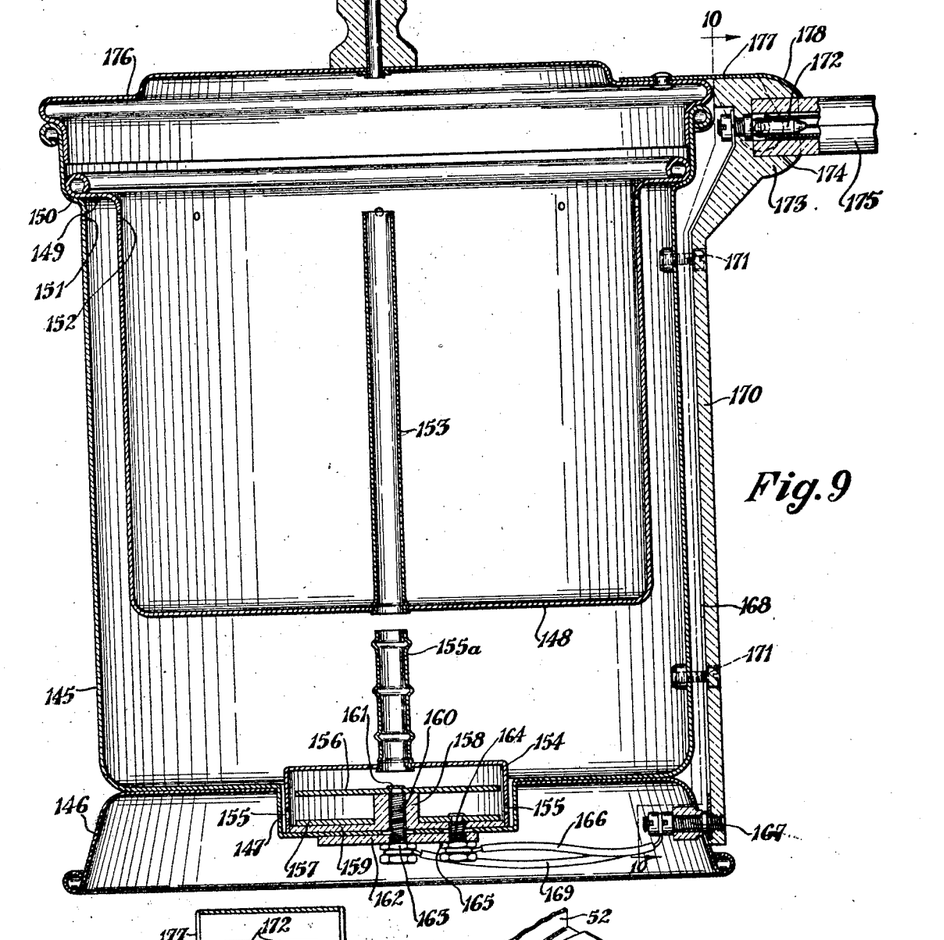
Fig. 9, a vertical sectional view through a double boiler or utility cooker embodying the invention.
Figure 10:
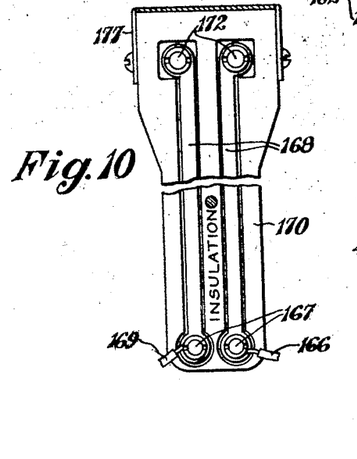
Fig. 10, a section on the line 10—10, Fig. 9.

A double boiler or utility cooker embodying the invention is illustrated in Figs. 9 and 10 of the drawings. The outer or lower water container 145 is supported upon an inverted shell base 146 and preferably provided with the central depression 147 to receive the heating unit which will be hereinafter described. The inner or upper water container 148 may be suspended within the upper portion of the outer container in any usual and well known manner such as by the peripheral rim flange 149 thereof resting upon the peripheral shoulder 150 formed near the upper open end of the outer or lower water container. Bleeder ports 151 and 152 may be optionally provided in the upper ends of the outer and inner water containers respectively if desired.

A central steam tube 153 may be provided through the upper or inner water container communicating at its lower end with the outer or lower container where it is desired to steam cook food placed in the inner container. However, if it is desired to use the utensil simply as the ordinary double boiler, this steam tube may be eliminated and the bottom wall of the inner container may be imperforate as in ordinary practice. The heating unit may be located within the recess 147 and enclosed within the inverted shell housing 154 provided with apertures 155 in its side walls to permit water from the outer or lower water container to pass into said housing. A hot water tube 155a is carried by the shell 154 and extends upwardly therefrom to a point near the bottom of the inner or upper water container 148.

This heating unit may include the upper and lower disk electrodes 156 and 157 respectively, the upper disk resting upon the upper end of the central boss 158 formed upon the insulation washer 159, upon the upper side of which the lower disk is supported. A binding screw 160 is located through said washer, the head 161 engaging the upper disk and an insulation washer 162 is located upon the bottom of the depressed portion 147, a clamping nut 163 being mounted upon the screw for binding all of said parts together.

The lower disk is connected to a binding screw 164 which extends through the insulation washers 159 and 162 and through the bottom wall of the depressed portion 147, a clamping nut 165 being provided for holding the parts in position. A lead wire 166 connects the binding screw 164 to one of the binding posts 167 connected to one of the bus bars 168 and a lead wire 169 connects the binding post 160 to the other binding post 167 connected to the other bus bar 168. These bus bars are located within an insulation shell 170 connected to one side of the outer or lower water container as by the bolts 171 and the upper ends of the bus bars are electrically connected to the plug-in points 172 located through the enlarged upper portion 173 of the Bakelite shell and extending into the socket 174 therein arranged to receive the connector plug 175.

The lid or cover 176 is hingedly mounted as by means of the hinge 177 provided with the curved flange 178 adapted to engage the connector plug 175 and prevent opening of the lid when the connector plug is in position, as shown in Fig. 9.

As above stated, if the utensil is intended for use as a double boiler, the steam tube 153 is eliminated and the bottom wall of the inner water container 148 is imperforate. To operate the same as a double boiler, water is placed in the lower or outer container 145 to any desired height, depending upon the length of cooking time required. The food to be cooked is placed in the inner or upper container 148 and the lid closed and connector plug attached, as shown in Fig. 9. The water passing into the heating unit housing will contact both of the disk electrodes, completing the circuit through the water and causing the same to boil, the steam passing up through the hot water tube 155a and entirely around the inside container 148.

If to be used as an automatic utility cooker, the steam tube 153 is provided as shown in Fig. 9. Sufficient water is placed within the lower or outer container to completely cover the hot water tube 155a so that hot water or steam from the heating unit is carried up through the tube 153 for steam cooking the food within the container 148. By providing sufficient bleeder ports 152, steam cooking may be obtained without the use of the tube 153 although if desired both may be used.

This utensil, as well as those above described, is preferably formed of insulated or insulation material and is so constructed that the user cannot accidentally receive an electric shock since it is necessary to disconnect the connector plug before the lid can be raised.

Figure 11:
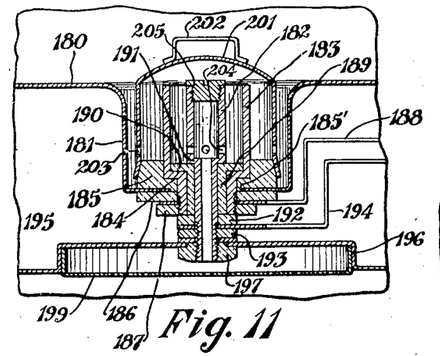
Fig. 11, a detail sectional view through a modified form of heating unit which is especially adapted for drip coffee maker.

In Fig. 11 is shown a modified form of heating unit which is especially adapted for drip coffee makers and the like. A portion of the water container is shown at 180 and preferably provided with the central socket 181 in its bottom wall to receive the heating unit. The heating unit includes the inner and outer shell or tube electrodes 182 and 183 respectively.

The outer tube is reduced near its lower end forming the shoulder 184 which is seated upon the insulation washer 185 resting on the bottom of the socket 181, the reduced portion extending through the enlarged central opening 185' in the bottom of said socket and through the insulation washer 186 located against said bottom wall, a nut 187 being provided upon the threaded lower end of said tube or shell electrode for clamping the same in position and for clamping the electric lead 188 into contact therewith.

An insulation bushing 189 is located within the lower reduced portion of the tube or shell electrode 184 and provided at its upper end with the peripheral flange 190 resting upon the shouldered portion 184 of said outer electrode. The inner electrode is reduced midway of its ends, forming the shoulder 191 which rests upon the flange 190 of the insulation boss and extends downward through the insulation washer 192 and is provided with a nut 193 upon its lower threaded end for clamping the inner electrode in position and clamping the electric lead 194 thereto.

The lower or outer shell 195 may have the central upwardly disposed socket 196 through which the threaded lower end of the inner electrode extends, an insulation nut 197 being provided for clamping the same in place. The perforate water spreader 199 may be frictionally mounted in said socket 196.

The heating unit cover 201 may be provided to enclose the electrodes and if desired, a handle 202 may be formed thereon for removing and replacing the same. Apertures 203 are formed in the lower portion of said cover and apertures 204 are provided in the electrode just above the shoulder 191 thereof so that water from the water container may pass between said electrodes and be discharged through the reduced portion of the inner electrode. A screw plug 205 may be provided for closing the upper end of the inner electrode. This type of heating unit may be provided in a drip coffee maker otherwise constructed identically the same as shown in Figs. 1 and 2.

Figure 12:
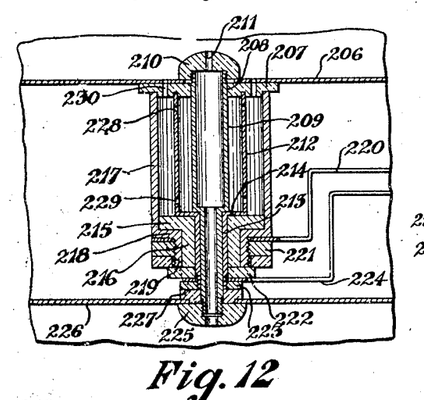
Fig. 12, a similar view of another modified form of heating unit especially adapted for drip coffee maker.

Fig. 12 shows a tube type heating unit especially adapted for use in drip coffee makers or other utensils where it is desirable to heat the water and discharge it automatically from the container. In this type of heating unit the water is heated without passing the electric current through the entire volume of water to be heated.

A portion of the bottom wall of the water container is indicated at 206 and an insulation washer 207 is located against the under surface thereof and provided with a central aperture 208 through which the upper threaded end of the direct water tube or channel 209 is located, an insulation nut 210, provided with a small central opening 211 being located upon said upper threaded end of the tube for positioning the same as shown.

The inner electrode tube 212 is located around and spaced from the water tube 209, the lower portion thereof being reduced as at 213, forming the intermediate shoulder 214 which rests upon the peripheral flange 215 at the upper end of the insulation boss 216. The outer electrode tube 217 surrounds and is spaced from the inner electrode tube, the lower end portion thereof being shouldered as at 218 and reduced as at 219 to fit around the outside of the insulation boss 216.

One electrode lead 220 is connected to the outer electrode tube by means of the nut 221 mounted upon the lower threaded portion of said tube and an insulation washer 222 is located upon the lower portion of the inner electrode tube 212, a nut 223 being mounted upon the lower threaded end thereof for securing the other electric lead 224 thereto.

An insulation nut 225 is mounted upon the lower threaded end of the water tube and against the underside of the lower shell 226, an insulation washer 227 being interposed between said nut and the nut 223. Apertures 228 and 229 are located in the upper and lower portions of the inner electrode tube 212 and apertures 230 are located through the bottom wall of the water container 206 and through the insulation washer 207.

Water from the water container thus passes down through the apertures 230 between the inner and outer electrode tubes and through the apertures 228 and 229 around the water tube 209, heating the same by contact of the boiling water so that the water from the water container which passes down through the water discharge tube 209 is heated as it is discharged from the container.

Figure 13:
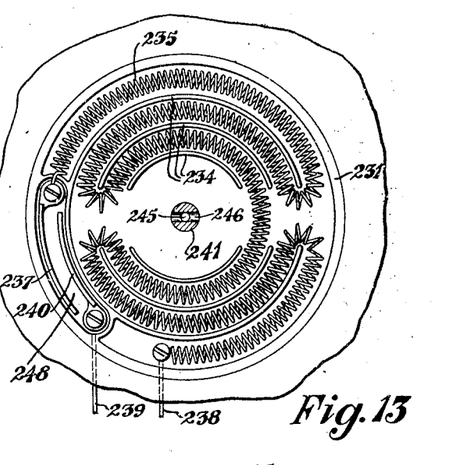
Fig. 13, a plan view of another form of heating unit embodying the invention.
Figure 14:
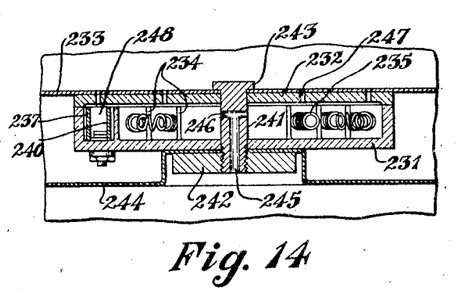
Fig. 14, a vertical sectional view of the same.

A partial open contact construction of heating unit for heating water without passing the current through the entire volume thereof is shown in Figs. 13 and 14. The form of the invention illustrated in these figures is especially designed for use in drip coffee makers or similar utensils where it is desirable to automatically discharge the heated water from the container.

A base 231 of porcelain, glass or other suitable insulation material, provided with an insulation cover 232, is mounted upon the underside of the bottom wall 233 of a water container or the like. Arcuate separating fins 234, of insulation material, are provided within the hollow base 231 and a coiled heating element 235 of any standard design is wound around these fins within the base, one end thereof being connected to one of the arcuate electrodes 237 which may be formed of stainless steel or the like, the other end being connected to one of the electric leads 238, the other lead 239 being connected to the other electrode 240 which is spaced from the electrode 237.

A central discharge tube 241 is located within the insulation base and extends downward through the bottom of the same, the lower end being screw threaded and receiving the nut 242 which coacts with the head 243 to clamp the water container 233 and lower shell 244 together. A central passage 245 is located within the lower portion of the tube 241, communicating at its upper end with the transverse passage 246. Apertures 247 are formed through the bottom of the water container 233 and through the insulation cap 232.

In operation, after filling the water container with cold water, the water passes down through the apertures 232, filling the channels between the fins 234 and as it overflows the same it passes into the compartment 248 which contains the electrodes 237 and 240, the water making contact between said electrodes, closing the circuit and heating up the element 235 so as to boil the water as it passes around said element and before it is discharged through the tube 241.

Figures 15, 16, 17:
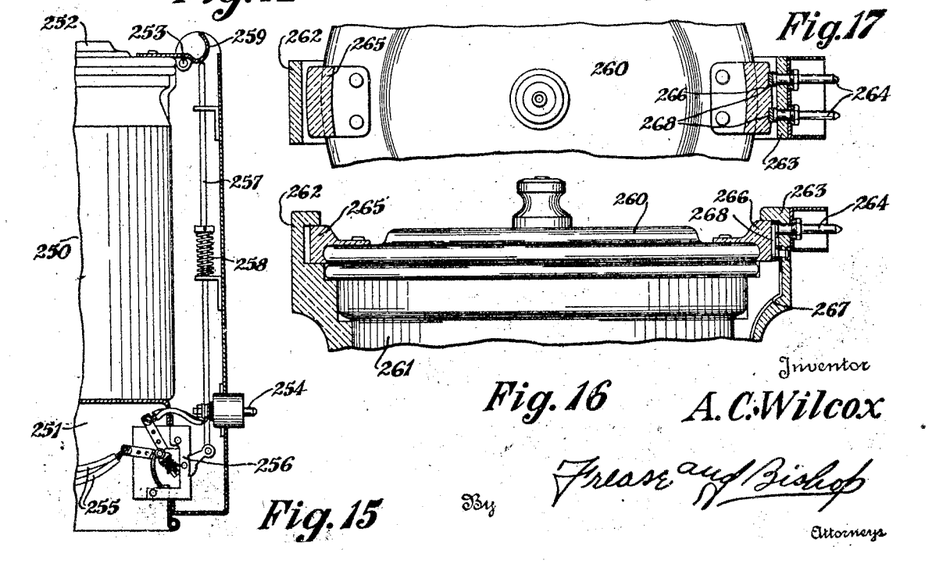
Fig. 15, a fragmentary sectional elevation of a portion of a cooking utensil provided with a hinged lid and toggle switch for breaking the circuit to the heating unit.
Fig. 16, a vertical sectional view of a portion of a cooking utensil provided with a bayonet swivel cover or lid for closing and opening the circuit to the heating unit.
Fig. 17, a fragmentary plan sectional view of the same.
Figure 19:
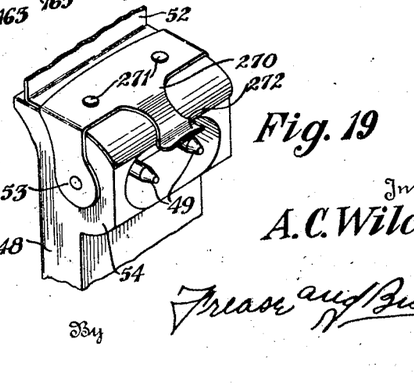
Fig. 19, a detail perspective of the lid hinge.

In Fig. 15 is shown a portion of a cooking utensil which may be provided with any one of the above described heating units and so arranged that when the lid is opened, a switch located in the circuit to the heating unit is automatically opened, the switch being automatically closed when the lid is closed.

A portion of the cooking utensil which may be of any type is indicated generally at 250, mounted upon a base 251 and having a lid 252 hinged to the utensil as at 253.

Plug-in points for connection of a connector plug may be provided as shown at 254 and lead wires 255 may lead therefrom to the heating unit, a toggle switch 256 of any suitable design being located between the plug-in points and heating unit. A push rod 257, normally urged upward as by the coil spring 258, is operatively connected to the toggle switch and arranged to be depressed by the cam 259 carried by the lid 252. As the lid is raised, this cam depresses the push rod 257 against the upward pressure of the spring, opening the toggle switch and as the lid is closed, the spring 258 forces the push rod upward in the position shown in Fig. 15, closing the switch.

The utensil shown in Figs. 16 and 17 may be of any type, the lid 260 thereof being adapted to be rotated in order to move the same to closed and locked position or to open position. For this purpose, each side of the utensil 261 is provided with an insulation ear as shown at 262 and 263, the ear 263 carrying the plug-in points 264 for reception of the ordinary connector plug. Locking lugs 265 and 266 are carried at diametrically opposite sides of the lid for engagement with said ears. It should be understood that both the ears and locking lugs should be made of suitable insulation material.

The electric leads 267 are spaced from the plug-in points as best shown in Fig. 16 and a pair of bus bars 268 are carried by the lug 266 and arranged to make contact between each plug-in point and the corresponding lead when the lid is in the closed and locked position, as shown in Figs. 16 and 17. When the lid is turned sufficiently to release the lugs from the ears upon the utensil, the bus bars will be moved out of contact with the leads and plug-in points, breaking the circuit to the heating unit.

It should be understood that any one of the heating units above illustrated and described may be used with the form of lids shown in Figs. 1 to 9 inclusive, or with those shown in Figs. 15 to 17 inclusive, without in any way changing the construction or departing from the invention, the primary object of which is to provide a utensil having an open contact heating unit in which the contact is made by the water to be heated and in which the opening of the lid of the utensil automatically breaks the circuit to the heating unit. It should also be understood that all of the utensils are to be formed of any suitable insulated or insulation material such as above referred to.

If desired, the hinge of each of the lids may be provided with a leaf spring 270 such as shown in Fig. 1, connected to the hinge member 52 as by a rivet or the like 271 and having the curved end 272 adapted to normally extend down beyond the end of the curved flange 55 of the hinge when the lid is closed. With such a construction, in order to insert the connector plug 50, it is necessary to push upward upon the free end of the spring with the upper surface of the connector plug, thus forcing the lid tightly closed and holding a spring tension on the same as long as the connector plug is in position, as shown in Fig. 1.

The form of heating unit shown in Fig. 18 is especially designed for a drip coffee maker or similar device, in which the water is automatically discharged from the container as it is heated. The lower portion of the water container is indicated at 275 and the lower shell connected thereto is shown at 276. The bottom wall of the water container 275 is preferably sloped downward toward the center and the lower shell 276 is preferably provided with the central upwardly disposed pocket 277.

A bushing 278 is located through both of these portions and provided with the discharge tube 279 having the annular corrugations 280 providing considerably more surface of the hot discharge tube for contact with the water to be heated. The inner and outer electrode rings 281 and 282 respectively are spaced from each other and from the discharge tube 279, being carried within the insulation bushing 283 and connected to the electric leads 284 and 285 respectively.

A removable cap 286 encloses the lower end of the heating unit, a nut 287 being provided upon the threaded lower end of the discharge tube 279 for holding said cap in position. Apertures 288 may be provided in the bushing 278 to permit water from the container to surround the discharge tube 279 and fill the space between the electrode rings so as to complete the circuit through the water, heating this water to boiling point and permitting steam to pass up through the apertures 288 to preheat the water in the container which flows down through the discharge tube 279 and is heated by contact with the heated corrugated side walls thereof.

If hard water is used in the utensil causing a lime deposit to form upon the electrode rings, the nut 287 and cap 286 may be easily removed and a knife or other tool used to scrape this deposit from the electrode ring.

I claim:

1. An automatic electric utensil including a container adapted to receive water to be heated, two spaced electrodes adapted to be immersed in said water, electric leads for connecting the electrodes with a source of electric energy, a lid hinged upon the container, means for preventing the opening of the lid until the circuit to the electrodes is broken, and a shield carried by the lid adapted to completely cover the electric leads when the lid is open.

2. An automatic electric utensil including a container adapted to receive water to be heated, two spaced electrodes adapted to be immersed in said water, electric leads for connecting the electrodes with a source of electric energy, a lid hinged upon the container, and means operated by the lid for breaking the circuit to the electrodes when the lid is opened and for closing the circuit to the electrodes when the lid is closed.

3. An automatic electric utensil including a container adapted to receive water to be heated, two spaced electrodes adapted to be immersed in said water, electric leads connected to said electrodes, a lid hinged upon the container, a connector plug for connection to said electric leads, means upon the lid for preventing opening of the lid when the connector plug is connected, and a shield carried by the lid adapted to completely cover the electric leads when the lid is open.

4. An automatic electric utensil including a container adapted to receive water to be heated, two spaced electrodes adapted to be immersed in said water, electric leads connected to said electrodes, a lid hinged upon the container, a connector plug for connection to said electric leads, and a shield upon the lid adapted to completely cover the electric leads for preventing connecting of said connector plug when the lid is open.

5. An automatic electric drip coffee maker including a water container, a coffee basket beneath the water container, heating means associated with the water container, means for discharging the water from the water container through the coffee basket, the heating means being inoperative when the water is discharged from the water container, a lid for the water container, and means for preventing opening of said lid until the heating means is rendered inoperative.

6. An automatic electric drip coffee maker including a water container, a coffee basket beneath the water container, heating means associated with the water container, means for discharging the water from the water container through the coffee basket, the heating means being inoperative when the water is discharged from the water container, a lid for the water container, and means for rendering the heating means inoperative when the lid is opened.

7. An automatic electric utensil including a container adapted to receive water to be heated, heating means associated with said container, a lid hinged upon the container, and means upon the lid for preventing opening of the lid until the heating means is rendered inoperative and for preventing the heating means from being rendered operative while the lid is open.

8. An automatic electric utensil including a container adapted to receive water to be heated, heating means associated with said container, a lid hinged upon the container, and a spring shield upon the lid rendering the heating means inoperative when the lid is opened.

9. An automatic electric utensil including a container adapted to receive water to be heated, a heating unit including a housing communicating only with said container, a spaced pair of electrodes in said housing adapted to be continuously immersed in said water, electric leads for connecting said electrodes to a source of electric energy and a steam tube communicating with said housing and extending into said container whereby the water will be continuously circulated from the container through the housing and back to the container.

10. An automatic electric utensil including a container adapted to receive water to be heated, a heating unit including a housing communicating only with said container, a spaced pair of electrodes in said housing adapted to be continuously immersed in said water, electric leads for connecting said electrodes to a source of electric energy, and a hot water tube communicating with said container and located through said housing whereby the water will be continuously circulated from the container through the housing and back to the container.

11. An automatic electric utensil including a container adapted to receive water to be heated, a heating unit including a housing communicating with said container, a spaced pair of annular electrodes in said housing adapted to be immersed in said water, electric leads for connecting said electrodes with a source of electric energy, and a removable imperforate cap provided with a peripheral flange upon the housing and within the container for obtaining access to said electrodes.

12. An automatic electric utensil including a container adapted to receive water to be heated, a heating unit including a housing communicating with said container, a spaced pair of annular electrodes in said housing adapted to be immersed in said water, electric leads for connecting said electrodes with a source of electric energy, and a transversely corrugated water discharge tube communicating with said container and extending through said housing.

13. An automatic electric utensil including a container adapted to receive water to be heated, a discharge spout at one side of the container, a heating unit including a plurality of spaced electrodes located adjacent to said spout and adapted to be immersed in said water as it is poured through said spout, and means for connecting said electrodes to a source of electric energy.

14. An automatic electric utensil including a container adapted to receive water to be heated, a heating unit including a housing communicating with said container, heating means within said housing adapted to be immersed in said water, a steam tube communicating with said housing and extending into said container, a second container having an imperforate bottom wall located within said first named container and adapted to contain food to be cooked, there being a communication between the first named container and the upper portion only of the second named container.

ALBERT C. WILCOX.